(No Model.)
J. A. HENRY.
COMBINED VALVE DEVICE AND VESSEL SUPPORT.
No. 468,041. Patented Feb. 2, 1892.
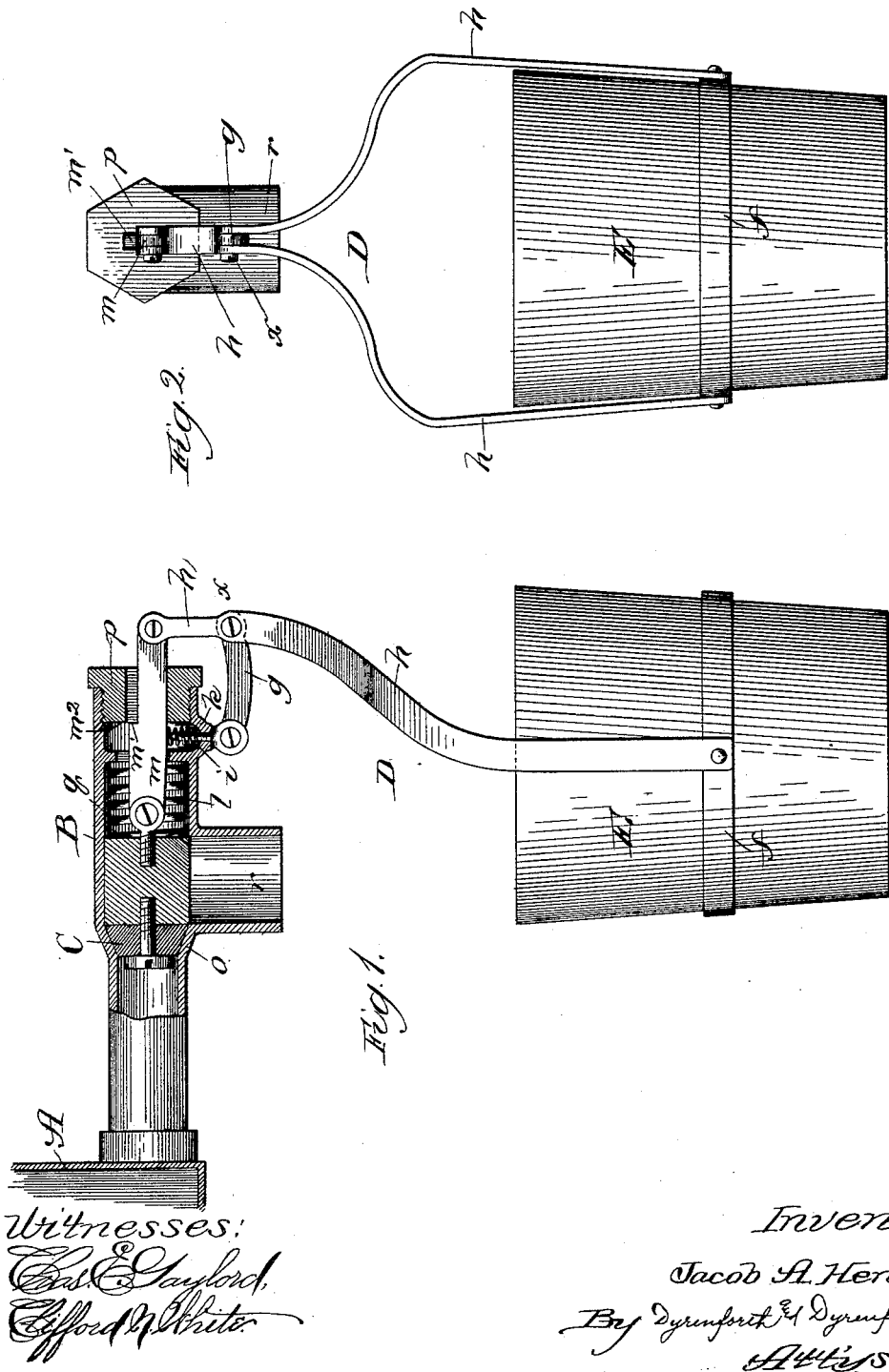
Witnesses:
Chas. E. Gaylord,
Clifford M. White.
Inventor:
Jacob A. Henry,
By Dyrenforth & Dyrenforth,
Attys.

UNITED STATES PATENT OFFICE.

JACOB A. HENRY, OF CHICAGO, ILLINOIS, ASSIGNOR OF ONE-HALF TO W. N. SATTLEY, OF SAME PLACE.

COMBINED VALVE DEVICE AND VESSEL-SUPPORT.

SPECIFICATION forming part of Letters Patent No. 468,041, dated February 2, 1892.

Application filed March 25, 1891. Serial No. 386,315. (No model.)

*To all whom it may concern:*

Be it known that I, JACOB A. HENRY, a citizen of the United States, residing at Chicago, in the county of Cook and State of Illinois, have invented a new and useful Improvement in a Combined Valve Device and Vessel-Support, of which the following is a specification.

My invention relates to an improvement whereby the valve in the discharge-passage of a liquid-holder shall be adapted to close automatically and to be opened by the act of placing a vessel in proper position to receive a supply of the liquid permitted to discharge from the holder on so opening the valve.

There are various connections in which my improvement is capable of advantageous use; but I design it more especially for application to drinking-water holders, and particularly to the water-tank in a railway-car, because of the extreme proneness in the latter to carelessness on the part of passengers manipulating the faucet and the drinking-vessel in placing the latter under the faucet for its supply, thereby wasting the water, entailing the necessity for frequently supplying the holders and the consequent annoyance and expense, besides messing the surroundings, and particularly the floor, which the water, furthermore, tends to rot. I prevent the objectionable consequences thus referred to, as well as others, by combining with the valve controlling the outlet of the holder a support for the vessel to be supplied therefrom, connected with the valve and affording a handle for operating it by placing the vessel in position to be supplied from the holder.

By reason of the particular use stated designed for my improvement and for the sake of convenience I illustrate it and confine the description thereof hereinafter contained to its connection with a holder for drinking-water and a drinking-vessel, with more particular reference to a railway-car, though I intend to be understood as desiring to cover it in connection with any analogous use to which it is applicable—thus, for example, in railway-stations and other public places—and for other liquids than water.

In the accompanying drawings, Figure 1 is a view in broken sectional side elevation, showing a representation of a water-holder provided with my improved faucet, having connected with its valve the operating-handle in the form of a pivotally-suspended rack having seated within it a drinking-glass. Fig. 2 is a view of my improved device in front elevation with the drinking-glass in its normal position.

A denotes a holder for water, and B is its faucet, which, though it may involve any of various forms and constructions, is preferably of the form illustrated and of the construction hereinafter described.

The faucet B shown is of general T shape, that portion of the head portion of the T connected with the tank or holder A being narrower than the stem portion $r$ thereof forming the nose or outlet, and than the remaining part $q$ of the head, forming an extension, which is closed by a perforated plug $p$ or head at its end and contracted toward its junction with the narrow portion to afford a tapering seat $o$ for a valve C, preferably of soft rubber on a sliding block $n$, closely fitting the part $q$ and extending normally across the inlet to the outlet-nose $r$. The valve-stem $m$ is pivotally connected at one end with the outer end of the valve and extends thence through the head $p$, the valve-stem being controlled by a spring $l$, confined inside the part $q$ of the faucet. On the stem $m$ is a shoulder $m'$, adapted to abut against the offset $m^2$ afforded by the inner end of the plug $p$ under certain conditions and for a purpose hereinafter explained. Below the valve-stem, in a pocket $k$ inside the faucet, is a spring $i$, confined against the pivotal stem $m$ and tending to force it in the direction to engage its shoulder $m'$ with the offset $m^2$ and obstruct the longitudinal outward movement of the stem, and consequently the removal of the valve from its seat.

D is a bracket comprising the bail portion $h$, pivotally connected at one end with the outer end of the valve-stem $m$ and fulcrumed at $x$ to one end of a link $g$, fastened at its opposite end to the faucet, as represented, the bail being fastened at its lower end to a ring $f$, adapted to receive and form a seat for a drinking-vessel or "glass" E.

The force the spring $l$ exerts against the valve C should be sufficient to overcome the weight of the tumbler (even when the latter is full) in its seat, though the weight of the bracket-handle D is insufficient to overcome the power of the spring $i$, tending to force the valve-stem $m$ into position to abut its shoulder $m'$ against the offset or stop $m^2$ and thus preclude the possibility of withdrawing the stem to open the valve until the vessel E is supported in its seat $f$.

In Fig. 1 the parts are shown in their relatively-normal positions, wherein the glass E is not sufficiently far under the faucet-outlet $r$ to receive the flow from the faucet, to start which requires that the handle D be moved inward on its fulcrum, thereby withdrawing the valve to open the faucet. When the desired quantity of water has been admitted into the drinking-vessel, on releasing the pressure exerted to push it into place the spring $l$ closes the valve, thereby shutting off the supply, and when the vessel is removed from its seat for drinking from it the spring $i$ effects locking of the stem $m$ in the manner described, preventing the faucet being again opened until the glass is again seated in its supporting-bracket.

As will be noticed, by providing the nose $r$ of greater diameter than that part of the faucet immediately connected with the tank A the water will discharge so readily as to tend to prevent its passing the valve into the part $q$, thereby obviating any necessity for packing.

My object may be accomplished by constructions of the device differing from the described construction and which may suggest themselves to others. Hence I do not limit my invention to all the details set forth nor to the particular construction shown and described.

What I claim as new, and desire to secure by Letters Patent, is—

1. In combination, a liquid-holder, a valve controlling the discharge-outlet from the holder, and a vessel-seat connected with the valve and depending therefrom below the plane of the said outlet and movable laterally toward the line of the discharge to open the valve, substantially as described.

2. In combination, a liquid-holder, a valve controlling the discharge-outlet from the holder and having a self-locking valve-stem, and a vessel-seat connected with the valve and depending below the plane of the said outlet and movable toward the line of the discharge to open the valve, substantially as described.

3. In combination, a faucet for the outlet of a liquid-holder, a spring-controlled valve in the faucet, and a handle depending from the faucet and connected with the valve, the handle terminating in a seat extending below the plane of the discharge-opening in the faucet and movable laterally toward the line of the discharge to open the valve, substantially as described.

4. In combination, a faucet B for the outlet of a liquid-holder, a valve C in the faucet, controlled to close automatically by a spring $l$ and having a stem $m$ and a handle D, fulcrumed, as at $x$, and pivotally connected toward one end with the valve-stem and forming at its opposite end a seat for a vessel E, substantially as and for the purpose set forth.

5. In combination, a faucet B for the outlet of a liquid-holder, a self-closing valve C in the faucet, having a self-locking valve stem $m$, and a handle D, fulcrumed, as at $x$, and connected toward one end with the stem $m$ and forming at its opposite end a seat for a vessel E, the weight of the handle being insufficient to unlock the valve-stem, substantially as and for the purpose set forth.

6. In combination, a faucet B for the outlet of a liquid-holder, a valve C in the faucet, controlled to close automatically by a spring $l$ and having a stem $m$, provided with a shoulder $m'$ to engage a stop in the faucet, a spring $i$, tending to produce engagement of the said shoulder with the stop, and a handle D, fulcrumed, as at $x$, and pivotally connected toward one end with the valve-stem and forming at its opposite end a seat for a vessel E, substantially as and for the purpose set forth.

7. In combination, a faucet B for the outlet of a liquid-holder, having a valve-seat $o$, a nose $r$, of greater diameter than the inlet portion of the faucet, and an extension $q$, closed at its end by a head $p$, a valve C in the faucet, having a stem $m$, controlled by a spring $l$, and provided with a shoulder $m'$ to engage a stop $m^2$, a spring $i$, bearing against the stem and tending to produce such engagement of the shoulder and stop as to lock the stem, and a bracket-handle D, fulcrumed to one end of a link $g$, connected at its opposite end with the faucet, the handle being pivotally connected at one end with the valve-stem and formed at its opposite end with a seat $f$ for a drinking-vessel E, the whole being constructed and arranged to operate substantially as described.

JACOB A. HENRY.

In presence of—
J. W. DYRENFORTH,
M. J. FROST.